W. S. LA LONDE.
ELECTRIC SWITCH FOR AUTO GEAR SHIFT AND BRAKE LEVERS.
APPLICATION FILED OCT. 27, 1919.
1,436,507.
Patented Nov. 21, 1922.
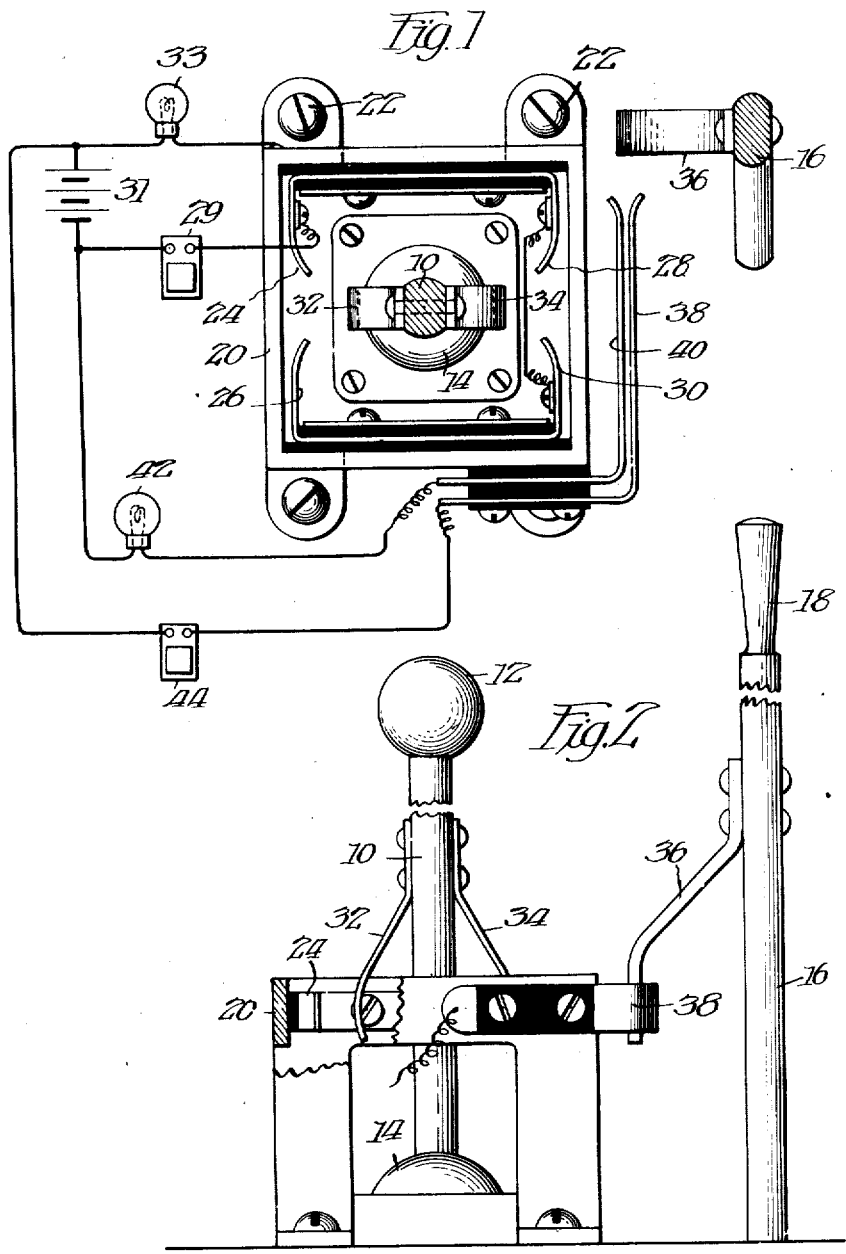

Patented Nov. 21, 1922.

1,436,507

UNITED STATES PATENT OFFICE.

WILLIAM S. LA LONDE, OF EVANSTON, ILLINOIS.

ELECTRIC SWITCH FOR AUTO GEAR-SHIFT AND BRAKE LEVERS.

Application filed October 27, 1919. Serial No. 333,646.

*To all whom it may concern:*

Be it known that I, WILLIAM S. LA LONDE, a citizen of the United States, residing at Evanston, in the county of Cook and State of Illinois, have invented a certain new and useful Improvement in Electric Switches for Auto Gear-Shift and Brake Levers, of which the following is a specification.

This invention relates to alarm mechanism for automobiles. The object of this invention is to provide an electric switch for an alarm circuit adapted to be automatically operated and controlled by an operating lever of automobiles, either the gear shift lever or the hand or emergency brake lever so that when the gears are in mesh or when the brake is in operation, an electric signal will be given at a distant point.

The invention consists in means for carrying out the foregoing objects which can be easily and cheaply made, which is satisfactory in operation and not readily liable to get out of order. More particularly the invention consists in many features and details of constructions to be hereafter more fully set forth in the specification and claim.

Referring to the drawings in which like numerals represent the same parts thruout the several views, Figure 1 is a plan view of the mechanism for use in connection with the gear shift and brake levers on automobiles, for carrying out the foregoing objects.

Figure 2 is a side elevation of the parts shown in Figure 1.

Referring particularly to Figure 2 there is shown the gear shift lever 10 surmounted by the usual ball 12, the lever being adapted for movement on the joint 14 into four different positions corresponding to the usual different gear settings. Adjacent to this is the brake lever 16 operated by handle 18.

Surrounding the lever 10 is placed the frame work 20 secured in place on the floor or other suitable support of the automobile, by screws 22. At each of the four corners of the frame 20 are switch contacts 24—26—28 and 30, suitably connected by wires not of special interest in this application with buzzer 29 and lamp 33 operated by battery 31. The lever 10 carries on opposite sides two spring clips 32 and 34, the former selectively engageable with contacts 24 and 26, the latter selectively engageable with contacts 28 and 30. Lever 20 is electrically connected to ground, viz., the frame of the engine, and when it is in neutral or central position no electric circuit is established, but when it is moved so that either of the spring clips 32 or 34 are in engagement with the clips 24 and 26 or 28 and 30 which takes place when any set of gears is in mesh an electric circuit is formed actuating the signal devices 29 and 33.

The adjacent lever 16 is also provided with a clip 36 which is adapted to pass like a knife switch between spring members 38 and 40 insulated from each other as shown and electrically connected to the lamp 42 and buzzer 44 and the battery 31. The result of this is that when lever 16 is moved to brake setting position member 36 passes between members 38 and 40 and actuates signals 42 and 44.

Having thus described my invention what I claim as new and desire to secure by Letters Patent, is:—

In mechanism of the class described, the combination of the usual gear shift lever of an automobile, movable to four different positions for different gear arrangements, a rectangular frame surrounding the lever having at each of its four corners an electric contact device, a pair of spring contacts on opposite sides of the gear shift lever, one adapted to contact one or the other of two of said switch contacts as the lever is moved to its respective gear shift positions, the other spring contact being adapted to correspondingly engage the other two contacts.

In witness whereof, I have hereunto subscribed my name in the presence of two witnesses.

WILLIAM S. LA LONDE.

Witnesses:
DWIGHT B. CHEEVER,
ANNA ROSENTHAL.